United States Patent [19]

Gehrke

[11] Patent Number: 4,756,640
[45] Date of Patent: Jul. 12, 1988

[54] AXIAL RETAINING MEMBER

[75] Inventor: Glenn F. Gehrke, Brighton, Mich.

[73] Assignee: GKN Automotive Components Inc., Auburn Hills, Mich.

[21] Appl. No.: 524,750

[22] Filed: Aug. 19, 1983

[51] Int. Cl.$^4$ .......................... F16B 7/04; F16J 15/50
[52] U.S. Cl. .................... 403/326; 403/359; 403/372; 74/18.1; 464/145
[58] Field of Search ............... 403/372, 377, 326, 359, 403/371, 289, 361, 50, 202, 223, 225, 226, 405.1, 406.1; 308/DIG. 11; 384/539, 585; 74/18.1, 18; 24/625, 614; 464/146, 145, 906

[56] References Cited

U.S. PATENT DOCUMENTS

| | | | |
|---|---|---|---|
| 2,510,362 | 6/1950 | Anderson | 74/18.1 |
| 3,039,716 | 6/1962 | Visockis | 403/289 X |
| 3,139,768 | 7/1964 | Biesecker | 403/372 |
| 3,354,302 | 11/1967 | Greasley | 403/289 X |
| 3,407,882 | 10/1968 | Wodden et al. | 403/372 |
| 3,747,966 | 7/1973 | Wikes et al. | 403/377 |
| 3,782,840 | 1/1974 | Brishka | 403/361 |
| 3,822,790 | 7/1974 | Arman et al. | 403/371 |
| 4,081,218 | 3/1978 | Gabriel | 403/359 |
| 4,222,310 | 9/1980 | Garret et al. | 403/372 |
| 4,343,563 | 8/1982 | Berhagen | 403/359 |
| 4,447,066 | 5/1984 | Katagiri et al. | 74/18.1 |

FOREIGN PATENT DOCUMENTS

2627397 12/1977 Fed. Rep. of Germany.

*Primary Examiner*—Randolph A. Reese
*Assistant Examiner*—Peter M. Cuomo
*Attorney, Agent, or Firm*—Remy J. VanOphem

[57] ABSTRACT

An axial retaining member for retaining a male member and a female member against relative axial motion therebetween. The axial retaining member includes a longitudinally extending main body having a longitudinal axis, a first end, a second end, and a central passageway therethrough for mounting the main body to the male member. Positive interconnection means, such as an inwardly oriented flange, are provided for interconnecting one end of the main body to the male member and a second interconnection means, such as an outwardly oriented radial flange, is provided for interconnecting the opposite end of the main body to the female member. A plurality of longitudinal slots are optionally formed in the main body to separate one end of the main body into a plurality of flexible fingers to facilitate interconnection of that end of the main body with its associated male or female member.

27 Claims, 3 Drawing Sheets

AXIAL RETAINING MEMBER

BACKGROUND OF THE INVENTION

The present invention relates to axial retaining members and more particularly to a unitary axial retaining member for interconnecting two components and preventing axial motion therebetween. The present invention is particularly useful for preventing relative axial motion between a female member, such as an inner race of a half-shaft assembly, and a shaft inserted in a bore in the female member.

There are many mechanical structures requiring the interconnection between a shaft and a female member having a bore for the shaft. Often, what is desired is a structure for preventing relative axial motion between the shaft and the female member. An example of a device requiring such a structure is a half-shaft assembly used in the drive train of a front wheel drive automobile. Typically, a shaft is provided which is inserted in a bore in an inner race. Cooperating splines are provided between the shaft and the inner race to prevent relative rotation therebetween.

Typically, two or more fastening members are used for interconnecting the shaft and the inner race. A first fastening member may be a retainer ring disposed ahead of the splines on the shaft and forced by the splines into a retaining position below the minor diameter of the inner race splines. In this position, the retaining ring expands into a groove in the inner race and separation of the shaft from the inner race is prevented. However, a certain amount of movement of the shaft relative to the inner race is still possible.

A second retaining member consisting of a spacer ring may also be provided, the spacer ring being fitted in an annular bore on the shaft and abutting a portion of the inner race so as to prevent further movement of the shaft into the bore in the inner race. Thus, the spacer ring cooperates with the retaining ring to prevent movement of the shaft relative to the inner race in either direction.

A chamfer angle is machined at the bottom of a counterbore of the above described bore and this chamfer angle acts in a wedge-like fashion, compressing the retaining ring inwardly and thus facilitating disassembly. This chamfer angle must be carefully selected to avoid inadvertent disconnection of the assembly during use, yet to permit disassembly when required for service.

The use of two separate retaining elements, as described above, is expensive and inconvenient. Accordingly, what is needed is a unitary axial retaining member to replace the two or more retaining members previously used.

A prior design for a unitary retaining means is described in U.S. Pat. No. 3,832,076, to Glenn Gehrke. The retaining ring disclosed therein is used to interconnect a male and female splined member. The female member has an annular radially inwardly facing retaining groove that is located radially opposite an annular radially outwardly facing retaining groove on the male member when the splined members are in the desired mating relationship. The splined members are retained together by a retaining ring of the snap ring type which is split and may be positioned such as to occupy both the retaining grooves when the grooves are radially aligned. The size of the retaining ring is determined so that the retaining ring is expanded against the bottom of the retaining groove and is in interference contact with the splines between their major and minor diameters. The retaining ring is urged by ramps on one end of the splines of one of the members into an assembly-disassembly position in an annular groove on the other member. Upon proper mating of the members, the retaining ring assumes a retention position in the grooves. However, one of the grooves is ramped on one side to provide disassembly by reversal of the assembly operation. Accordingly, the retaining ring described above does not positively connect the female splined member with the male splined member and, accordingly, inadvertent disassembly during use is possible under extreme conditions.

Various other designs have been developed in the past for interconnecting splined elements. For example, U.S. Pat. No. 3,527,120 to M. J. Duer, et al., teaches a differential and axle shaft retainer which includes a spring member retained on the axle shaft by tangs engaging a groove formed on the shaft. The body of the retainer is flexible outwardly for installation on the axle shaft and flexes inwardly so as to permit sliding of the axle shaft through the differential case and side gear openings into its installed position. Upon installation, the retainer fingers spring outwardly into engagement with the abutting surfaces of the side gears so as to lock the axle shaft in position and prevent outward axial movement thereof.

Brown, U.S. Pat. No. 2,089,168 as well as Hawkins, U.S. Pat. No. 3,449,926 both teach a means for locking a nut or hub member to a shaft. In Brown, a hub having splines with one side parallel to the hub axis and another side tapered is mounted to a splined shaft with parallel splines utilizing an intermediate member having fingers which have been machined to cooperate between the splines of the hub and shaft member. The fingers on the intermediate member are parallel to the axis on one side and tapered on the other side so that when the hub and intermediate member are mounted to the shaft, a nut is tightened against the intermediate member such that the fingers engage the tapered sides of the hub splines and carry the hub along until it abuts against the spacer. Further tightening of the nut then accomplishes two results. First, the tapered fingers are wedged circumferentially in the tapered spaces between the hub splines and the shaft splines. Second, the axial pressure from the nut also forces the hub firmly against the spacer, thus, clamping the bearing race against the shoulder. This assembly provides a tight circumferential driving fit between the hub and the shaft.

In Hawkins, a turbine shaft is coupled to the shaft of a compressor drive utilizing a thrust nut which prevents any relative rotation of the thrust nut and the shaft to which it is threaded, and which is readily adjustable by a tool inserted through one shaft. A safety interlock is provided such that the tool cannot be removed after the nut has been adjusted unless it has been stopped at the position where the detent is effective. Accordingly, the coupling is an axially adjustable connection between coaxial shafts. In this coupling, the fingers serve to couple the nut to a locking device or lock ring. A plurality of wave springs and ring members are built up on the thrust nut which includes the part extending axially defined by fingers to nonrotatively lock the ring to a shaft. The snap ring groove extends around the rear end of the fingers to receive a snap ring and thereby lock the wave springs and ring members to the thrust nut.

Smith, U.S. Pat. No. 2,625,415, teaches a flexible splined connection for a pair of members in which one of the members is provided with a plurality of integral, independently flexible longitudinally extending keys or fingers which are expanded in such a manner to ensure contact over the entire contact area of a mating spline passage. The longitudinally extending keys or fingers are manufactured by slotting or cutting the splined end of the shaft and expanded radially by applying pressure to the ring at the base portion of the recess so that the outer diameter of the circumferentially spaced keys is slightly larger than the diameter of the spline passage. Upon assembly, the keys are individually flexed inwardly a slight amount and when in position, each individual key contacts a portion of the adjacent keys and its mating keyway in the hub to thereby maintain even contact and constant pressure along the entire length and diameter of the passage. Prior to forming the splines on the shaft, an outer annular ridge is machined on the shaft of such dimension as to fit within the recess. It is interesting to note for this particular application, the splined end of the shaft must protrude beyond the hub member in order to enable disassembly from the shaft. In fact, this was specifically set forth in Column 3 of the Smith patent.

None of these prior designs, however, address the basic problem described above, that is, providing a simple, inexpensive, unitary retaining member for positively axially retaining a shaft to an inner race of a half-shaft assembly.

SUMMARY OF THE PRESENT INVENTION

The present invention provides a member for positively retaining a female member and a male member, such as a shaft and an inner race for a half-shaft assembly, against relative axial movement, and further provides a unitary axial retaining member.

The axial retaining member of the present invention is a longitudinally extending member having a central passageway therethrough permitting the mounting of the axial retaining member on a male member or shaft. A first interconnection means, such as a radial flange, extends inwardly from the axial retaining member adjacent one end thereof and provides an interconnection between the axial retaining member and the male member. A second interconnection means, such as an outwardly oriented radial flange, extends outwardly from the axial retaining member adjacent the opposite end thereof and provides an interconnection between the axial retaining member and a female member.

In the preferred embodiment, a plurality of longitudinal slots are formed in the axial retaining member extending from at least one of the ends thereof towards the opposite end thereof so as to split that one end into a plurality of longitudinally extending flexible fingers. When the fingers are provided at the end of the axial retaining member associated with the female member, additional shorter fingers may be provided to abut the female member and provide a more positive interconnection therebetween. The fingers are preferably proportioned such as to be in a stressed condition when in use such as to positively lock the axial retaining member to one of the male or female members.

Also in the preferred embodiment, the outwardly oriented flange preferably includes an annular shoulder forming an angle of no more than ninety degrees relative to the main body so as to positively retain the flange in an inwardly oriented annular channel in the female member. Furthermore, the second flange is preferably provided with a frustoconically shaped end cooperating with a frusto-conically shaped surface of the female member so as to resiliently guide the flexible fingers to deflect inwardly towards the shaft to facilitate rapid interconnection between the axial retaining member and the female member.

The primary object of the present invention is to provide an axial retaining member for retaining a female member and a male member against relative axial movement therebetween in an inexpensive, efficient, and positive manner. This object is accomplished by providing a unitary axial retaining member fitted onto the male member and positively engaging the male member and the female member.

Another object of the present invention is to provide an inexpensive and reliable axial retaining member for positive interconnection of a splined male member with a splined female member. The reliability of the axial retaining member of the present invention is enhanced by the flexible fingers being prestressed in their locking position, such as to positively secure the splined male and female members together.

Still another object of the present invention is to provide a removable axial retaining member suitable for use in positively interconnecting a splined axle to an inner race of a half-shaft assembly.

Yet another object of the present invention is to provide a reliable axial retaining member which facilitates the rapid and reliable interconnection of a female member with a male member. The axial retaining member of the present invention facilitates this rapid interconnection by the use of cooperating frusto-conical surfaces on the axial retaining member and the female member.

These and many other objects, features, and advantages of the present invention will become apparent to those skilled in the art upon reviewing the following detailed description of the preferred embodiment together with the drawings appended hereto.

DETAILED DESCRIPTION OF THE PREFERRED EMBODIMENT

Figures 1, 2, 3, 4:
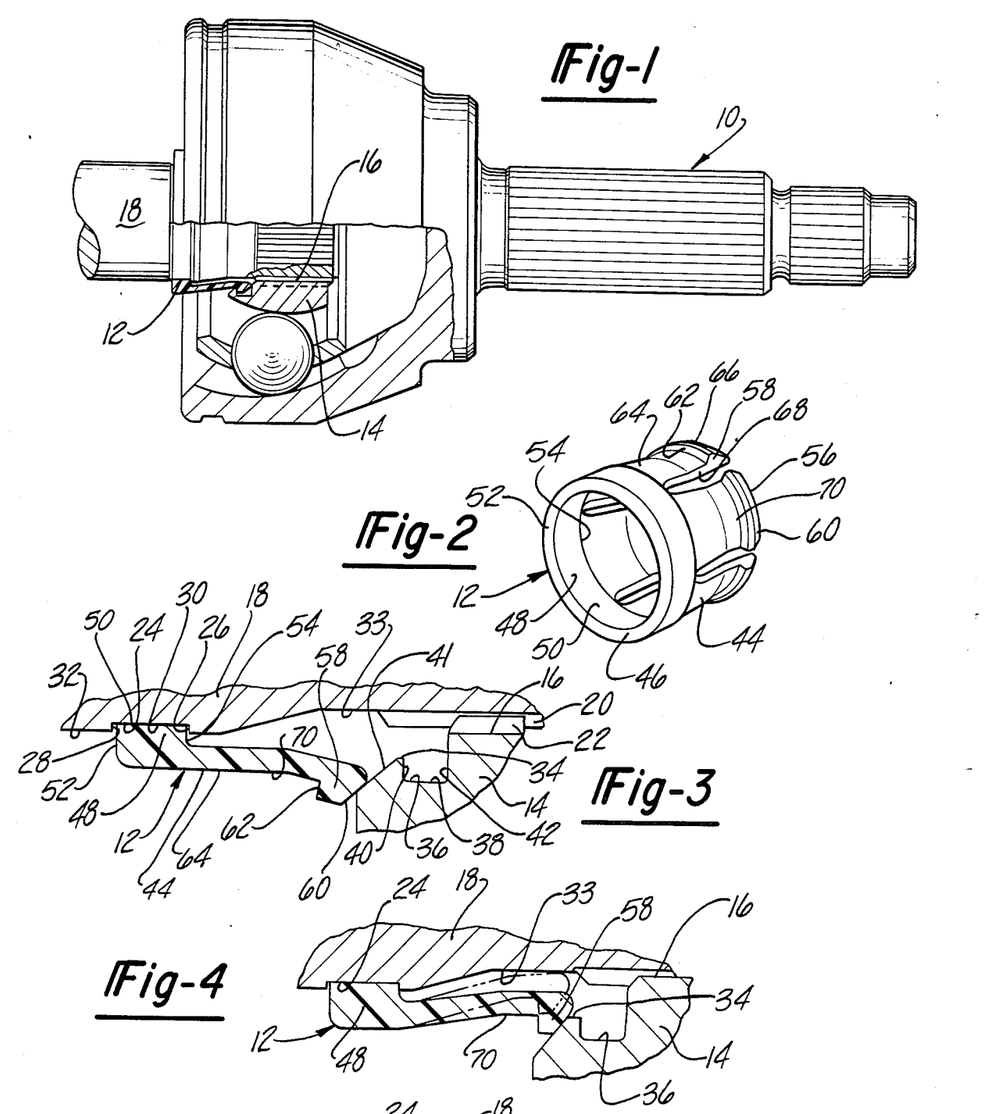
FIG. 1 is a partially cutaway side view of a half-shaft assembly using an axial retaining member according to the present invention.
FIG. 2 is a perspective view of an example of an axial retaining member according to the present invention.
FIG. 3 is an enlarged cutaway view of a portion of the half-shaft assembly and axial retaining member of FIGS. 1 and 2 and illustrating the axial retaining member disengaged from the inner race thereof.
FIG. 4 is a view similar to FIG. 3 but illustrating the elements thereof as the axial retaining member is advanced partially towards engagement with the inner race.

Referring now to the drawing and more particularly to FIG. 1 thereof, a half-shaft assembly 10 is illustrated using an axial retaining member 12 according to the present invention. The half-shaft assembly 10, in general, is well known and, accordingly, the many individual components thereof are not described in detail herein. Furthermore, it will be understood by those skilled in the art that the present invention, while illustrated in relation to a half-shaft assembly, has applicability for interconnecting various members. The axial retaining member of the present invention is particularly well suited for interconnecting splined shafts and splined male members to prevent relative axial movement therebetween, but may be used for other more diverse interconnection functions, as will be apparent to those skilled in the art upon reviewing the following detailed description in conjunction with the drawings.

The half-shaft assembly 10 includes an inner race 14 having a bore 16 therein. A shaft 18 is fitted in the bore 16 and is prevented from rotating relative thereto by mating splines 20 and 22 (FIG. 3) extending, respectively, from the shaft 18 and from the inner race 14. The axial retaining member 12 of the present invention is provided to inhibit axial movement of the shaft 18 relative to the inner race 14 and further to facilitate rapid assembling of the half-shaft assembly 10.

As illustrated in FIG. 3, the shaft 18 is provided with an outwardly oriented annular channel 24 having a base 30 and annular walls 26 and 28 extending from the base 30 to an outer peripheral cylindrical surface 32 of the shaft 18. The annular walls 26 and 28 form abutments for a retaining means retaining the shaft against motion relative to the inner race 14. In previous half-shaft assemblies, a spacer ring is fitted in a channel similar to the outwardly oriented annular channel 24 and abuts a portion of the inner race 14 to prevent movement of the shaft relative to the inner race in one direction, as indicated above in the discussion of previous retention means for half-shaft assemblies.

The shaft 18 is further provided with a reduced diameter surface portion shown in FIG. 4, to provide clearance of the axial retaining member 12 in a manner to be described later.

The inner race 14 is provided with a counterbore 34 coaxial with the bore 16 and an inwardly oriented annular channel 36 extending around the counterbore 34 and opening radially into the counterbore. As indicated in FIG. 3, the inwardly oriented annular channel 36 has a base portion 38 and two annular walls 40 and 42 each extending from the base portion 38 of the channel towards the shaft 18. The inwardly oriented annular channel 36 is dissimilar from the inwardly oriented annular channel used in prior half-shaft assemblies for securing the retaining ring, described above in detail in the background of the present invention, in that the inwardly oriented annular channel used for previous half-shaft assemblies was provided in the bore 16, rather than in a counterbore. The counterbore 34 is provided in the inner race 14 as illustrated so as to permit clearance for the axial retaining member 12, as will become apparent shortly. A frusto-conical sloping surface 41 is provided adjacent the counterbore 34 and slopes inwardly towards the counterbore.

The axial retaining member 12 of the present invention takes the place of both the spacer ring and the retainer ring previously used in half-shaft assemblies and further facilitates the assembly of the half-shaft assembly 10. The axial retaining member 12 includes an elongated member having a main body portion 44, as best shown in FIG. 2. The main body portion 44 is formed of resilient material and has, in general, a tubular shape or a similar hollow form of revolution. The main body portion 44 has a first end 46 having an inwardly oriented radial flange 48 formed therein or adjacent thereto. The inwardly oriented radial flange 48 has a cylindrical base wall 50 and an outer and inner annular wall, 52 and 54 respectively, extending generally perpendicular to the cylindrical base wall. As shown in FIG. 3, the main body portion 44 of the axial retaining member 12 may be fitted onto the shaft 18 with the inwardly oriented radial flange 48 fitted into the outwardly oriented annular channel 24. The outer annular wall 52 and the inner annular wall 54 cooperate with the annular walls 40 and 42, respectively, to maintain the inwardly oriented radial flange in a predetermined axial position relative to the shaft 18.

The axial retaining member 12, as shown in FIG. 2, is provided with a second end 56 opposite the first end 46. An outwardly oriented radial flange 58 is provided at or adjacent to the second end 56. The outwardly oriented radial flange 58 is provided with a frusto-conical surface 60 having an increasing diameter in the direction extending from the second end 56 towards the first end 46 of the axial retaining member 12. The outwardly oriented radial flange 58 is further provided with an annular surface 62 extending generally perpendicular to the main body portion 44 and extending between an outer cylindrical surface 64 of the main body portion 44 of the axial retaining member 12 and the frusto-conical surface 60. An intermediate cylindrical surface 66 is optionally provided between the surfaces 62 and 60.

The axial retaining member 12 is further provided with a plurality of longitudinal slots 68 extending from the second end 56 thereof partially towards the first end 46 thereof. The longitudinal slots 68 divide the second end 56 of the axial retaining member 12 into a plurality of flexible fingers 70. The longitudinal slots further divide the outwardly oriented radial flange 58 into a plurality of independent flange portions. In the example shown in FIG. 2, four longitudinal slots 68 are provided and, accordingly, four flexible fingers 70 are provided.

Assembling of the half-shaft assembly 10 of the present invention using the axial retaining member 12 described above may now be appreciated by referring to FIGS. 3 through 5. As the shaft 18 is advanced further into the bore 16, the splines 20 and 22 become engaged.

Figure 5:
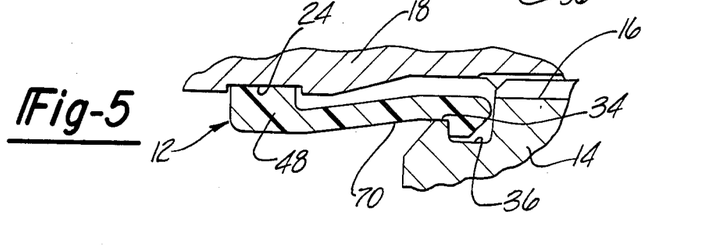
FIG. 5 is a view similar to FIGS. 3 and 4 but illustrating the axial retaining member fully engaging the inner race of the half-shaft assembly.

As shown in FIG. 3, the flexible fingers 70 of the axial retaining member 12 abut the inner race 14 when the axial retaining member is assembled to the shaft 18 and the shaft 18 is advanced into the bore 16 of the inner race. Specifically, the frusto-conical surface 60 of the outwardly oriented radial flange 58 at the end of the flexible fingers 70 encounters the frusto-conical surface 41 of the inner race. The frusto-conical surfaces 60 and 41 cooperate so as to bias the flexible fingers 70 inwardly towards the shaft, as shown in FIG. 4, until the outwardly oriented radial flange 58 clears the inwardly oriented annular channel 36. The outwardly oriented radial flange 58 then becomes trapped in the inwardly oriented annular channel 36, as illustrated in FIG. 5, due to the resilient restoring force of the flexible fingers 70.

It will be appreciated by those skilled in the art that clearance must be provided between the outer peripheral surface 32 of the shaft 18 and the inwardly oriented annular channel 36 in order to permit the passage therebetween of the second end 56 of the axial retaining member 12. As described above, the necessary clearance is provided by counterbore 34 in the inner race 14 and by the reduced diameter portion 33 in the shaft 18. It may be appreciated, however, that either one of these clearance features may be provided without the other clearance features, using appropriate dimensioning of the components.

As shown in FIG. 3, the flexible fingers 70 are preferably proportioned such as to extend in their unstressed condition to an outer diameter larger than the inner diameter of the base portion 38 of the inwardly oriented channel 36. Thus, when the flexible fingers 70 are trapped in the inwardly oriented channel 36, as illustrated in FIG. 5, a resilient restoring of the flexible fingers 70 positively biases the fingers outwardly and contributes to a secure engagement between the axial retaining member 12 and the inner race 14.

It will further be appreciated by one skilled in the art that the resilient structure of the flexible fingers 70, as well as the clearance described above, permits selective disassembling of the half-shaft assembly 10 by providing an external force to depress the flexible fingers 70 prior to attempting to remove the shaft 18.

Figures 8, 9:
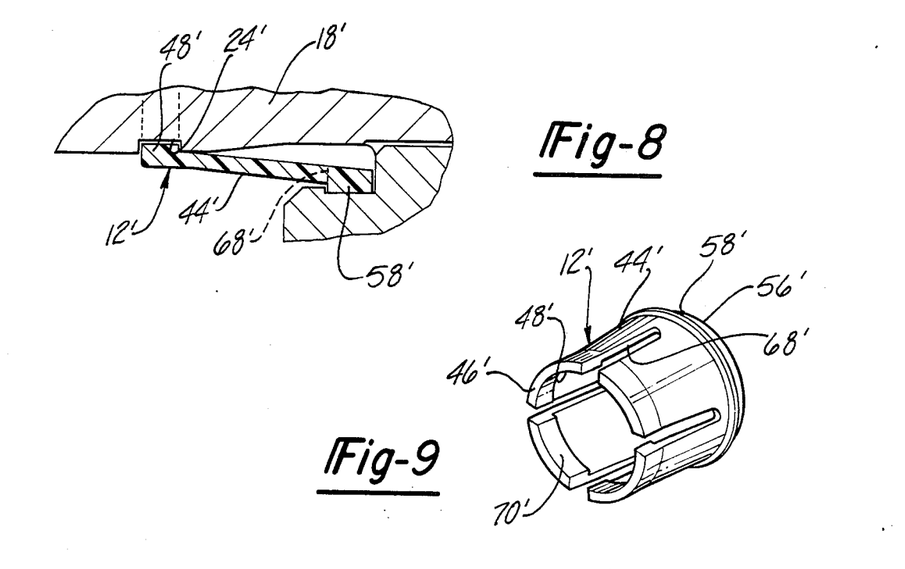
FIG. 8 is a view similar to FIG. 5 but illustrating another alternate example of structure for an axial retaining member according to the present invention.
FIG. 9 is a perspective view of the alternate axial retaining member of FIG. 8.

An alternate example of structure for an axial retaining member 12' is illustrated in FIGS. 8 and 9. The axial retaining member 12' is identical in structure and in function to the axial retaining member described above except as indicated below.

The axial retaining member 12' is provided with a frusto-conically shaped main body portion 44' wherein the diameter of the main body portion increases from the first end 46' towards the second end 56' thereof. The axial retaining member 12' is provided with an inwardly oriented annular flange 48' at its first end 46' and an outwardly oriented radial flange 58' extending from its second end 56' in a manner similar to the axial retaining member 12 described above. However, the longitudinal slots 68' of the axial retaining member 12' extend from the first end 46' thereof towards the second end 56' thereof, thus dividing the first end 46' into a plurality of flexible fingers 70'. It will be appreciated by those skilled in the art that the flexible fingers 70' of the axial retaining member 12' have the opposite function of the flexible fingers 70 of the previously described axial retaining member 12, in that the flexible fingers 70' secure the inwardly oriented radial flange 48' in an outwardly oriented annular channel 24' of a shaft 18'.

It will further be appreciated by those skilled in the art that an axial retaining member according to the present invention may be provided without providing any flexible fingers 70 or 70'. The resiliency of the material forming the axial retaining member would be sufficient, for many purposes, to permit the easy assembly of an axial retaining member to a shaft and an inner race. It should be noted, however, that the use of fingers are preferred since such fingers permit the easy assembly and disassembly of the shaft 18 to the inner race 14.

Figures 6, 7:
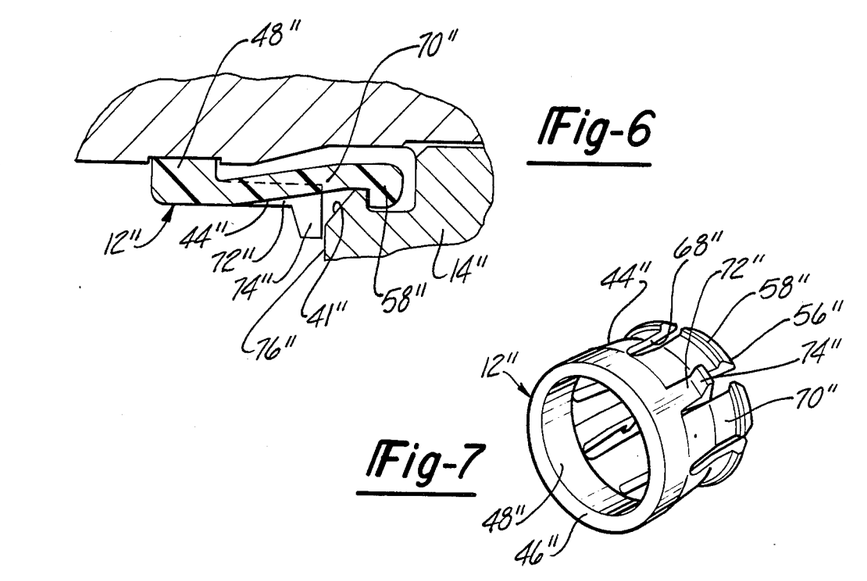
FIG. 6 is a view similar to FIG. 5 but illustrating an alternate example of structure of an axial retaining member according to the present invention.
FIG. 7 is a perspective view of the axial retaining member of FIG. 6.

Referring now to FIGS. 6 and 7, yet another alternate example of structure according to the present invention is illustrated. The axial retaining member 12'' illustrated in FIGS. 6 and 7 is substantially similar to the axial retaining member 12 described above except as distinguished below.

The axial retaining member 12'' is provided with a main body portion 44'' having an inwardly oriented radial flange 48'' at its first end 46'' and an outwardly oriented radial flange 58'' at its second end 56'' and a plurality of longitudinal slots 68'' separating the second end 56'' into a plurality of primary flexible fingers 70'', in a manner similar to the axial retaining member 12 described above. However, the axial retaining member 12'' is further provided with a plurality of secondary flexible fingers 72'' which are substantially shorter than the flexible fingers 70''. The secondary flexible fingers 72'' are provided with a second outwardly oriented radial flange portion 74''. The second outwardly oriented radial flange portion 74'' abuts a radial surface 76'' of the inner race 14'' disposed around the frusto-conical surface 41'' thereof and cooperates with the flexible fingers 70'' to more positively secure the axial retaining member 12'' to the inner race 14''.

For example, and as shown in the drawing, the axial retaining member 12'' may be provided with six longitudinal slots 68'', six primary flexible fingers 70'', and two oppositely disposed secondary flexible fingers 72''.

Figures 10, 11:
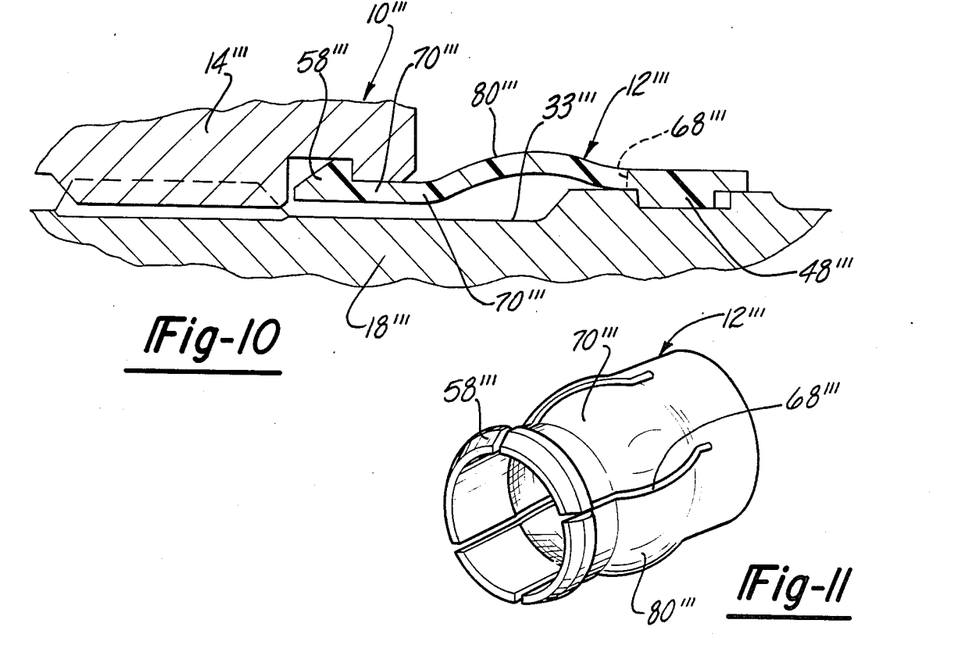
FIG. 10 is a view similar to FIG. 5 but illustrating still another alternate example of structure for an axial retaining member according to the present invention.
FIG. 11 is a perspective view of the alternate axial retaining member of FIG. 10.

Yet another alternate example of structure for an axial retaining member 12''' is illustrated in FIGS. 10 and 11. The axial retaining member 12''' is provided with an outwardly oriented bulge 80''' disposed between the outwardly oriented radial flange 58''' and the inwardly oriented radial flange 48'''. The plurality of longitudinal slots 68''' cut across the bulge 80'''. The bulge 80''' thereby facilitates rapid interconnection and disassembly of the shaft 18''' and the inner race 14''' since a convenient tool, not illustrated in the drawing, may be provided to temporarily encircle the bulge and deflect the flexible fingers inwardly when needed. Furthermore, the bulge 80''' permits a mechanic to rapidly disassembly the half-shaft assembly 10''' by inserting a cutting tool between the bulge 80''' and a reduced diameter portion 33''' of the shaft and cutting each of the flexible fingers 70'''.

It will be appreciated by those skilled in the art that the above description is offered by way of example and not by way of limitation. Accordingly, it is contemplated that various axial retaining members may be constructed utilizing some of the features of each of the axial retaining members 12, 12', 12'', and 12''' without using all of the features. For example, an axial retaining member may be constructed similar to the axial retaining member 12 of FIGS. 3 and 4 having a frusto-conical shape such that the flexible fingers 70 would be kept in a prestressed condition when engaged in the inwardly oriented radial channel. When such an axial retaining member is used, a tool, a retaining clip, or other retaining means may be used to temporarily deflect the flexible fingers 70 to temporarily secure the flexible fingers 70 against the shaft 18 during assembly.

The above description includes the best mode contemplated by the inventor at the time of filing for carrying out the present invention. It will be appreciated by those skilled in the art that many variations and modifications may be made to the present invention without departing from the spirit of the present invention. Such modifications and variations are included within the intended scope of the claims appended hereto.

What is claimed as novel is as follows:

1. An axial retaining member formed of a resilient material comprising:
   a longitudinally extending main body having a longitudinal axis, a first end and a second end;
   a central passageway through said main body along said longitudinal axis;
   first radial flange means extending radially inwardly from said main body and disposed adjacent said first end thereof;
   second radial flange means integral with and extending radially outwardly from said main body and disposed adjacent said second end thereof;
   a plurality of longitudinal slots formed in said main body and said second radial flange means, said plurality of longitudinal slots extending from one of said first and second ends towards the opposite of said first and second ends such as to separate said one of said first and second ends into a plurality of longitudinally extending flexible fingers; and
   wherein at least one of said flexible fingers is shorter than the other of said flexible fingers such as to extend only partially towards said one of said first and second ends, said at least one flexible finger further comprising intermediate radial flange means extending outwardly therefrom.

2. The axial retaining member of claim 1 wherein said flexible fingers are in a prestressed condition in use.

3. The axial retaining member of claim 1 wherein said main body and said first and second radial flange means are molded as a single piece of plastic.

4. The axial retaining member of claim 1 wherein said second radial flange means further comprises an annular shoulder extending from said main body and forming an internal angle therewith of no more than ninety degrees relative to said main body.

5. The axial retaining member of claim 1 wherein said second radial flange means is frustoconically shaped and increases in diameter from said second end towards said first end of said main body.

6. The axial retaining member of claim 1 wherein said main body is approximately cylindrical in shape.

7. The axial retaining member of claim 1 wherein said main body is approximately frustoconical in shape.

8. The axial retaining member of claim 1 wherein:
   said main body and said first and second radial flange means are formed as a single piece of plastic; and
   wherein said second radial flange means further comprises a frustoconically shaped surface which increases in diameter from said second end towards said first end of said main body and an annular shoulder extending from said frustoconically shaped surface to the outer surface of said main body and forming an internal angle therewith of no more than ninety degrees relative to said outer surface.

9. A unitary axial retaining member for interconnecting a first member with a second member, said unitary axial retaining member comprising:
   a hollow main body, said hollow main body having a longitudinal axis, a first end fitted over said first member, and a second end opposite said first end and adjacent said second member;
   first interconnection means extending radially inwardly from said first end of said hollow main body for interconnecting said hollow main body with said first member;
   second interconnection means extending radially outwardly from said second end of said hollow main body for interconnecting said hollow main body with said second member; and
   a plurality of longitudinal slots formed in said hollow main body and extending from one of said first and second ends towards the opposite of said first and second ends such as to separate said one of said first and second ends into a plurality of longitudinally extending flexible fingers; and
   wherein at least one of said flexible fingers is shorter than the other of said flexible fingers such as to extend only partially towards said one of said first and second ends, said at least one flexible finger further comprising a partial radial flange extending outwardly therefrom.

10. The unitary axial retaining member of claim 9 wherein said first interconnection means is in a prestressed condition when interconnected with said first member.

11. The unitary axial retaining member of claim 9 wherein said second interconnection means is in a prestressed condition when interconnected with said second member.

12. The unitary axial retaining member of claim 9 wherein at least one of said first and second members comprises a flange receiving cavity and at least one of said first and second interconnection means comprises a flange extending from said second end, said flange being received in said flange receiving cavity of said at least one of said first and second members.

13. The unitary axial retaining member of claim 12 wherein said flange further comprises an annular shoulder extending from said hollow main body and forming an internal angle therewith of no more than ninety degrees relative to said hollow main body.

14. The unitary axial retaining member of claim 12 wherein said flange extending from said second end is frustoconically shaped and increases in diameter in a direction from said second end towards said first end.

15. The unitary axial retaining member of claim 9 wherein said flexible fingers are in a prestressed condition when said unitary axial retaining member is interconnected with said first and second members.

16. The unitary axial retaining member of claim 9 wherein said hollow main body is approximately cylindrical in shape.

17. The unitary axial retaining member of claim 9 wherein said hollow main body is approximately frustoconical in shape.

18. In combination with a constant velocity universal joint of the type having an inner joint member having a splined bore therein, a shaft having a plurality of splines thereon, said splines of said shaft being mounted in said splined bore, the improvement comprising:
   a counterbore adjacent said splined bore in said inner joint member;
   a radially inwardly oriented annular channel located in said shaft, said radially inwardly oriented annular channel being spaced from said plurality of splines on said shaft;
   an annular channel in said inner joint member, said annular channel being oriented radially outwardly from said counterbore of said inner joint member;
   a hollow unitary axial retaining member formed of a resilient material, said hollow unitary axial retaining member having a longitudinally extending main body portion fitted onto said shaft; a radially inwardly oriented flange extending from said main body portion at one end of said main body portion, said radially inwardly oriented flange extending into said radially inwardly oriented annular channel of said shaft; and a radially outwardly oriented flange extending from said hollow unitary axial retaining member at an opposite end of said main body portion, said radially outwardly oriented flange further engaging said annular channel of said inner joint member; and a plurality of longitudinal slots formed in said main body portion of said hollow unitary axial retaining member, said plurality of longitudinal slots partially extending longitudinally in a direction from said opposite end of said main body portion towards said one end of said main body portion so as to separate said opposite end of said main body portion into a plurality of longitudinally extending flexible fingers, such that when said hollow unitary axial retaining member is mounted to said shaft and said plurality of splines of said shaft are mounted to said splines of said inner joint member, said plurality of flexible fingers resiliently move radially inward as said shaft is inserted into said inner joint member until said radially outwardly oriented flange engages said annular channel in said inner joint member to lock said inner joint member to said shaft.

19. The combination as claimed in claim 18 wherein said radially outwardly oriented flange further comprises an annular shoulder extending from said main body portion and forming an internal angle therewith of no more than ninety degrees relative to said main body portion.

20. The combination as claimed in claim 18 wherein said plurality of flexible fingers are in a prestressed condition when said hollow unitary axial retaining member is interconnected with said shaft and inner joint members.

21. The combination as claimed in claim 18 wherein said radially outwardly oriented flange is frustoconically shaped and increases in diameter in a direction from said opposite end towards said one end.

22. The combination as claimed in claim 18 wherein at least one of said plurality of flexible fingers is shorter than the other of said flexible fingers such as to extend only partially towards said opposite end, said at least one flexible finger further comprising a partial radial flange extending outwardly therefrom.

23. A locking arrangement comprising in combination:
a female member;
a splined bore extending through said female member;
a male member comprising a shaft, said shaft having a plurality of splines thereon, said plurality of splines of said shaft being mounted in said splines of said bore such that said shaft and said female member are prevented from relative movement;
a counterbore in said female member coaxial with said bore and disposed around a portion of said shaft;
a first radially oriented annular channel in said female member extending radially outwardly from said counterbore;
a second radially oriented annular channel in a portion of said shaft remote from said bore;
a hollow unitary axial retaining member formed of a resilient material and having a longitudinally extending main body portion fitted onto said shaft, said hollow unitary axial retaining member having a first end and a second end;
an inwardly oriented radial flange extending from said first end of said hollow unitary axial retaining member and engaging said second radially oriented annular channel;
an outwardly oriented radial flange extending from said second end of said hollow unitary axial retaining member and engaging said first radially oriented annular channel;
wherein said female member comprises an inner face of a universal joint; and
a plurality of longitudinal slots formed in said main body portion and extending from said second end towards said first end such as to separate said second end into a plurality of longitudinally extending flexible fingers.

24. The locking arrangement of claim 23 wherein said outwardly oriented radial flange extending from said second end of said hollow unitary axial retaining member further comprises a frustoconical outer surface increasing in diameter in a direction from said second end towards said first end.

25. The locking arrangement of claim 24 wherein said female member associated with said second end of said hollow unitary axial retaining member is further provided with a frustoconical surface cooperating with said frustoconical surface of said second end of said hollow unitary axial retaining member to resiliently deflect said plurality of flexible fingers as said second end is advanced towards said first radially oriented annular channel.

26. The locking arrangement of claim 23 wherein at least one of said flexible fingers is shorter than the other of said flexible fingers, such as to extend only partly towards said second end, said at least one flexible finger further comprising a partial radial flange extending radially outwardly and abutting a portion of said female member.

27. The locking arrangement of claim 23 wherein said flexible fingers are proportioned so as to be in a prestressed condition when engaged in said outwardly oriented radial channel.

* * * * *

UNITED STATES PATENT AND TRADEMARK OFFICE
CERTIFICATE OF CORRECTION

PATENT NO. : 4,756,640

DATED : July 12, 1988

INVENTOR(S) : Gehrke

It is certified that error appears in the above-identified patent and that said Letters Patent is hereby corrected as shown below:

Column 2, line 4, delete "assembly-dissem-" and insert ---- assembly-disassem- ----.

Column 4, line 2, delete "frustoconically" and insert ---- frusto-conically ----.

In the Claims

Column 12, line 24, delete "face" and insert ---- race ----.

Signed and Sealed this

Thirteenth Day of June, 1989

*Attest:*

DONALD J. QUIGG

*Attesting Officer*  *Commissioner of Patents and Trademarks*